United States Patent [19]
Deichmiller et al.

[11] 3,882,302
[45] May 6, 1975

[54] ELECTRO-OPTICAL MEASURING DEVICE

[75] Inventors: Arthur C. Deichmiller, North Branford, Conn.; Jack C. von der Heide, Arlington, Tex.

[73] Assignee: Universal Technology, Inc., Woodbridge, Conn.

[22] Filed: Feb. 20, 1973

[21] Appl. No.: 333,960

[52] U.S. Cl. ...... 235/92 DN; 235/92 V; 235/92 CA; 235/92 R
[51] Int. Cl. ............................................ G06m 3/14
[58] Field of Search ..... 235/92 DN, 92 MT, 92 CA, 235/92 V

[56]     References Cited
         UNITED STATES PATENTS
| | | | |
|---|---|---|---|
| 2,934,824 | 5/1960 | Braybrook | 235/92 MT |
| 2,991,365 | 7/1961 | Churchill | 235/92 MT |
| 3,242,320 | 3/1966 | Stout | 235/92 CA |
| 3,272,969 | 9/1966 | Cutaia | 235/92 DN |
| 3,637,996 | 1/1972 | Seymour | 235/92 DN |

*Primary Examiner*—Joseph M. Thesz, Jr.
*Attorney, Agent, or Firm*—Knobbe, Martens, Olson, Hubbard & Bear

[57]     ABSTRACT

A self-calibrating measuring device in which a particular unknown dimension of a given specimen is compared with the corresponding known dimension of a master specimen. The requisite dimensional information regarding the master specimen is obtained by direct physical measurement of the master specimen. That information is then stored in a memory from whence it may be read out in order to compare it with dimensional information, regarding the unknown specimens. Operation of the device is digital throughout. Two modes of operation allow display of information indicative either of the deviation between the master and unknown specimens, or of the actual dimension of the unknown specimen. Measurement of the master specimen by actual physical sensing calibrates the device such that it may be used to measure any given number of unknown specimens. Re-calibration may be accomplished chiefly by inserting a new master specimen. Thereafter the respective dimensions of any given number of unknown specimens may be compared with that of the new master specimen.

19 Claims, 10 Drawing Figures

ELECTRO-OPTICAL MEASURING DEVICE

BACKGROUND OF THE INVENTION

The present invention belongs to the area of electro-optical devices for comparing master dimensional information with information indicative of the corresponding dimension of an unknown specimen. The art is replete with devices belonging to the same general field as the present invention.

One such prior art device utilizes two photocells masked by slits. A reference slit is adjustable. Calibration is accomplished by placing a master specimen so as to cast a shadow through the non-adjustable slit onto one of the photocells. The other slit is then adjusted for a null output. If the light intensity on the two cells is the same, a null will result. The known specimen is then removed and an unknown specimen put in its place. This type of device is generally analog throughout.

Another method in common use involves linear arrays of discrete photocells. To utilize such a device it is necessary to program the master dimension information into a complex logic circuit or into a mini-computer. System set up is time consuming and expensive, and the device will only gage unknown parts against the stored dimension information until reprogrammed. Once the device is programmed, an unknown part is passed in front of a lens which casts a shadow of the part on the photo array. The array is simultaneously being scanned electronically at a high rate of speed. When a shadow is cast on the photo array, only those cells receiving light will output pulses. A count of the output pulses may be related directly to dimension.

Also known in the prior art are devices which allow simultaneous comparison of a master and an unknown specimen. A typical system is described in U.S. Pat. No. 3,546,377, issued to one John Troll. A pair of vidicons are simultaneously focused on a master and an unknown part, respectively. The analog signals developed are functions of the intensity of the light received at the respective vidicons. A differential amplifier compares the two signals.

SUMMARY OF THE INVENTION

The present invention provides a measuring device which may be used for comparing the dimensions of an unknown specimen with those of a known master specimen. The device is digital throughout and self-calibrating in that a master specimen can be sensed once and afterwards every unknown part examined will be compared to the master specimen. This feature obviates the prior art requirements for either programming the master dimensions into a mini-computer, or for simultaneously passing both the master and unknown specimens before identical sensing arrays. The output can be either in the form of a deviation from the standard or an actual dimension.

For simplicity of explanation, the measuring device may be considered to comprise six main portions: clock, measuring means, preamplifier, logic means, memory means and gage means. The measuring means provide a digital output indicative of the particular dimension sought to be measured. From the clock and measuring means combination, three signals are obtained: a video signal made up of pulses at the clock frequency; a start-of-scan signal which determines the beginning of each scan of the measuring means; and an end-of-scan signal which comes after each scan of the measuring means. The series of pulses produced by the measuring means is applied to a preamplifier, after which the conditioned signal is supplied to the logic means.

The logic means receives four basic signals, the three signals discussed above, plus a trigger, or command, signal. The trigger signal commands the logic to open a gate and allow a single scan of the measuring means to be passed to the mode switch when the specimen is in a certain position within the field of view. This trigger signal may be obtained in a number of ways, as for example, by a photocell, push-button, or any other device which can sense the position of a specimen in the field of view.

The gated signal from the logic is then passed to either the memory or gage means, responsive to switch means. When the device is being calibrated by measuring a master specimen, the switch means causes the gated signal to be passed to the memory means. When an unknown specimen is being gaged, the gated signal goes to the gage means, where it is compared with the information previously stored in the memory means. It is possible to utilize the present invention to measure a plurality of dimensions simultaneously by using multi-channel operation.

Thus it may be seen that the present invention obviates the requirement of complex computing networks and real-time comparison of the master and unknown specimens.

DESCRIPTION OF THE DRAWINGS

The various advantages of the present invention may be more fully appreciated by reading the following detailed description in conjunction with the below-described drawings, in which.

DETAILED DESCRIPTION OF THE PREFERRED EMBODIMENT

Figure 1:
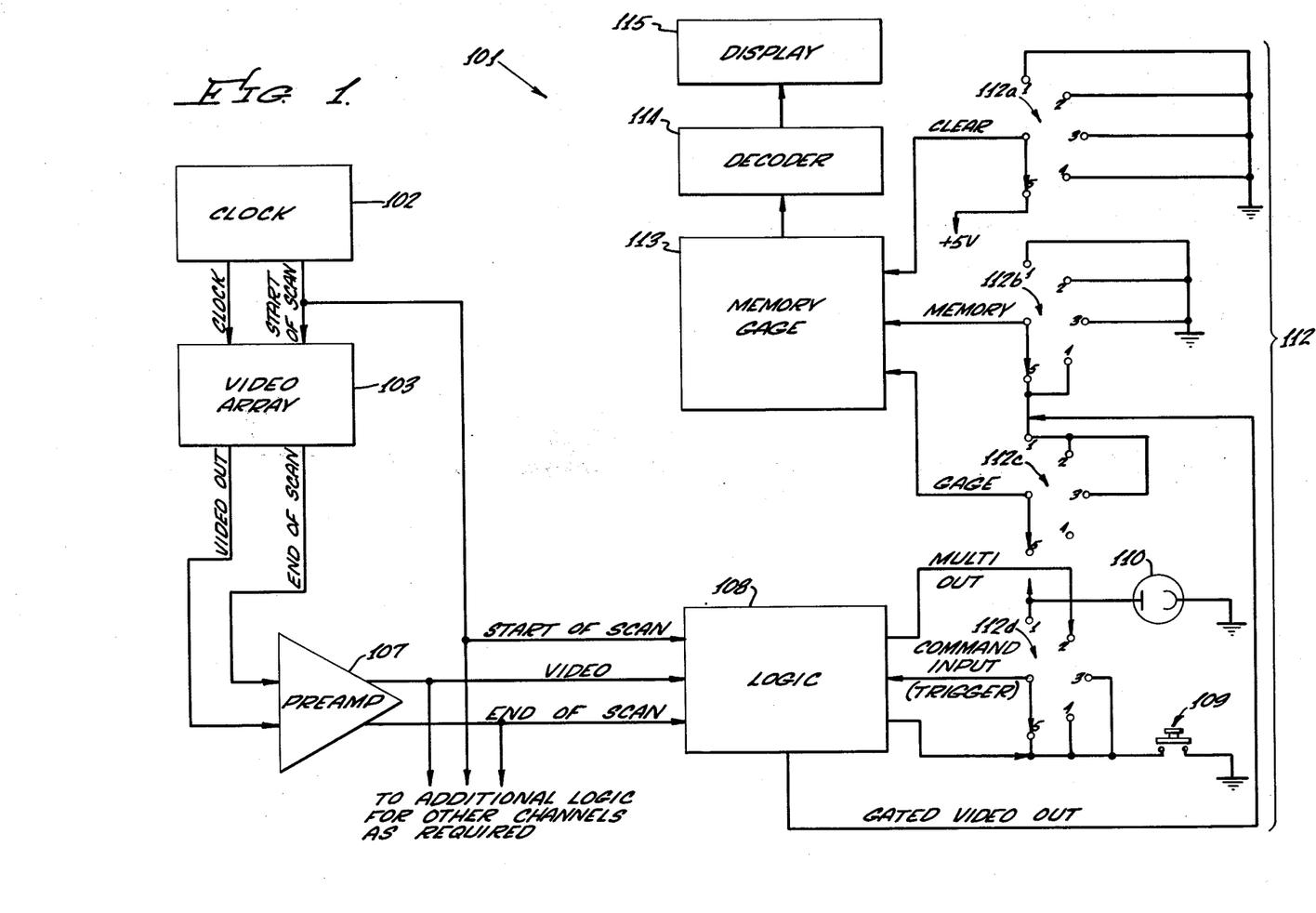
FIG. 1 is a flow diagram of the preferred embodiment of the present invention.

FIG. 1 is a signal flow diagram of the preferred embodiment of an electro-optical measuring device 101. A clock 102 provides two signals: a clock pulse train which is required to drive below-described measuring means 103; and a start-of-scan pulse train which is required to initiate a scan of the measuring means 103. The values of the various components which comprise the clock 102 are chosen to provide a start-of-scan pulse frequency of approximately 100 Hz, and a clock pulse frequency of approximately 27 kHz. As will be explained more fully below, this allows the measuring means 103 to scan completely between consecutive start pulses.

As may be seen by referring to FIG. 1, measuring means 103 are interconnected with the clock 102 so as to receive the clock and start-of-scan pulses therefrom. The measuring means 103 provide a digital output indicative of the dimension measured. In the preferred embodiment, the measuring means comprise a video array 103. The video array 103, though not necessarily so structured, is comprised chiefly of a light source 104 which causes radiant light energy to pass through a focusing lens 105 and to strike light sensitive means, which in the preferred embodiment comprise a commercially available series line scanner 106. The video array 103 is self-scanning at the clock frequency of 27 kHz and thus it provides a continuous series of output pulse trains, the number of pulses in each such pulse train being equal to the number of photodiodes receiving light energy from the light source 104 at the time the particular scan is made. The video array 103 also provides an end-of-scan pulse signal, which indicates the end of each complete scan of the line scanner 106 and which thus follows the end of each pulse train.

Figure 4:
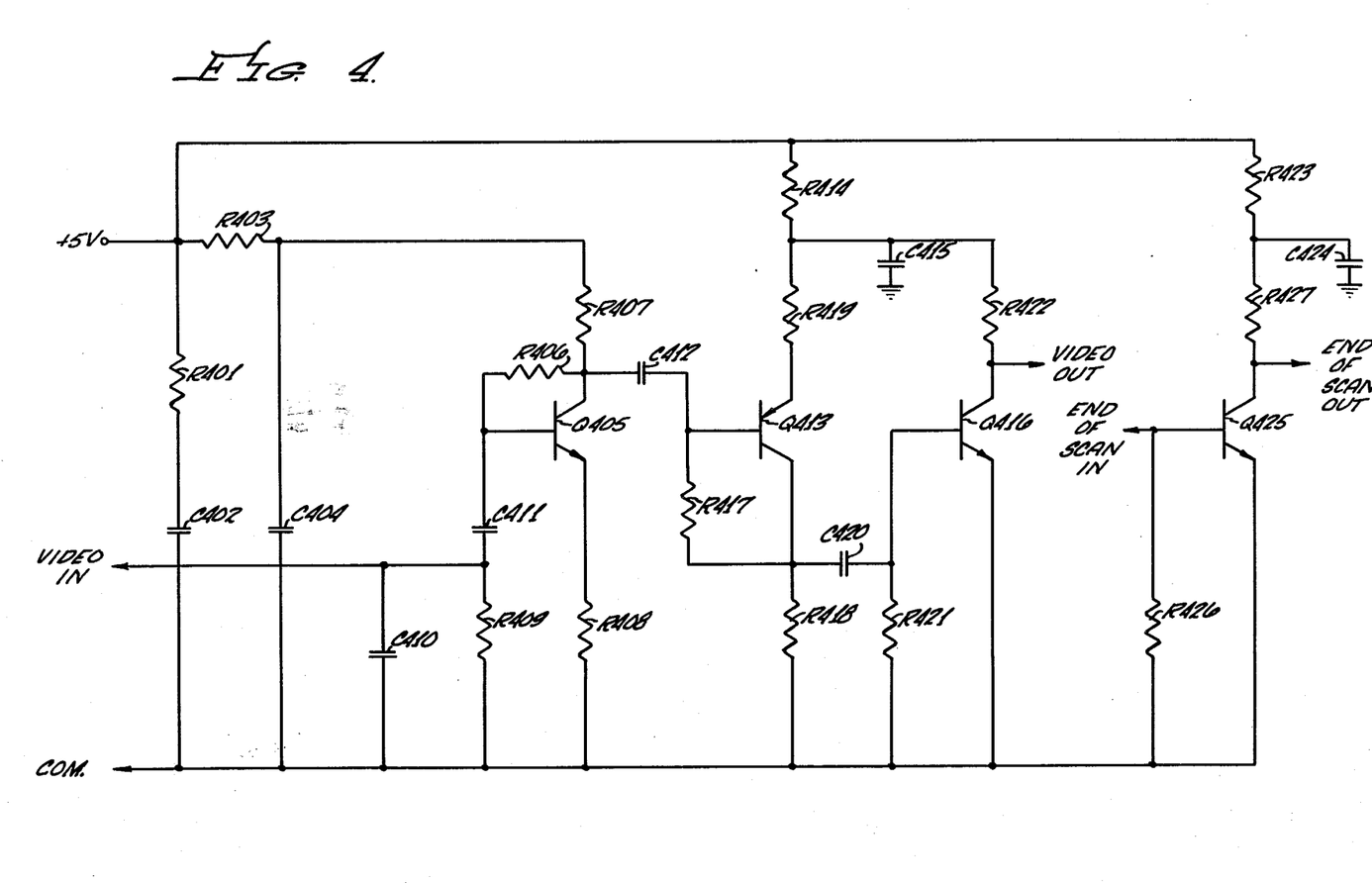
FIG. 4 is a schematic of the preamplifier shown in FIG. 1.

Next in order of signal flow is a preamplifier 107, which may be seen in greater detail in FIG. 4. The preamplifier 107 amplifies and conditions the video and end-of-scan information received from the video array 103, and additionally, the preamplifier 107 renders TTL-compatible the video and end-of-scan information in order to facilitate processing by succeeding stages of the device 101.

The two outputs from the preamplifier 107, along with the start-of-scan information from the clock 102, are sent to logic means 108, which gates the video signal from the preamplifier 107 such that only one pulse train (which pulse train derives from a single scan of the line scanner 106, as discussed above) goes to the stage following the logic network 108. The gate command, or trigger means, comprises a manual (pushbutton) switch 109, a photocell 110, and a multivibrator (hereinafter multi) 111. The multi 111 is internal to the logic network 108 and it provides a continuous trigger command when selected.

Switch means which in the preferred embodiment comprise ganged switches 112a, b, c, and d are provided external to the logic network 108 in order to allow selection of the respective mode of operation and trigger means desired. Each of the switches 112 has five positions: (1) "photocell", (2) "multi", (3) "pushbutton", (4) "memory", and (5) "clear". (The numbers in parentheses in the preceding sentence correspond to the numbered positions of the switch 112 shown in FIGS. 1 and 5.) Switch positions (1)–(3) constitute the gage mode, and position (4) indicates the memory mode, both of which will be explained more fully below.

The gated video output of the logic means 108 is applied to either the memory or gage means, depending on the mode selected via the switches 112b and 112c. It is contemplated that the memory means will be implemented in the preferred embodiment by a standard synchronous four bit counter, and that gage means will be implemented by a synchronous four bit up/down counter interconnected with the memory counter. For ease of illustration, and because of their mutual physical inter-relationship, the memory and gage means are shown as a single memory/gage 113 block in FIG. 1. Memory means and gage means proper will be denoted by reference numerals 113a and 113b, respectively. Output from the memory/gage means 113, in binary coded decimal (BCD) form, is applied to a decoder 114, which in turn provides a seven bar display 115 with information in the proper form.

It should be noted that the above description is predicated on single-channel operation of the present invention. By using a plurality of channels, however, a number of dimensions may be measured simultaneously. All that is required for multi-channel operation is a separate trigger, logic means, memory means, gage means, decoder and display for each separate dimension. The arrows indicated in FIG. 1 contemplate the possible utilization of additional channels.

CLOCK

Figure 2:
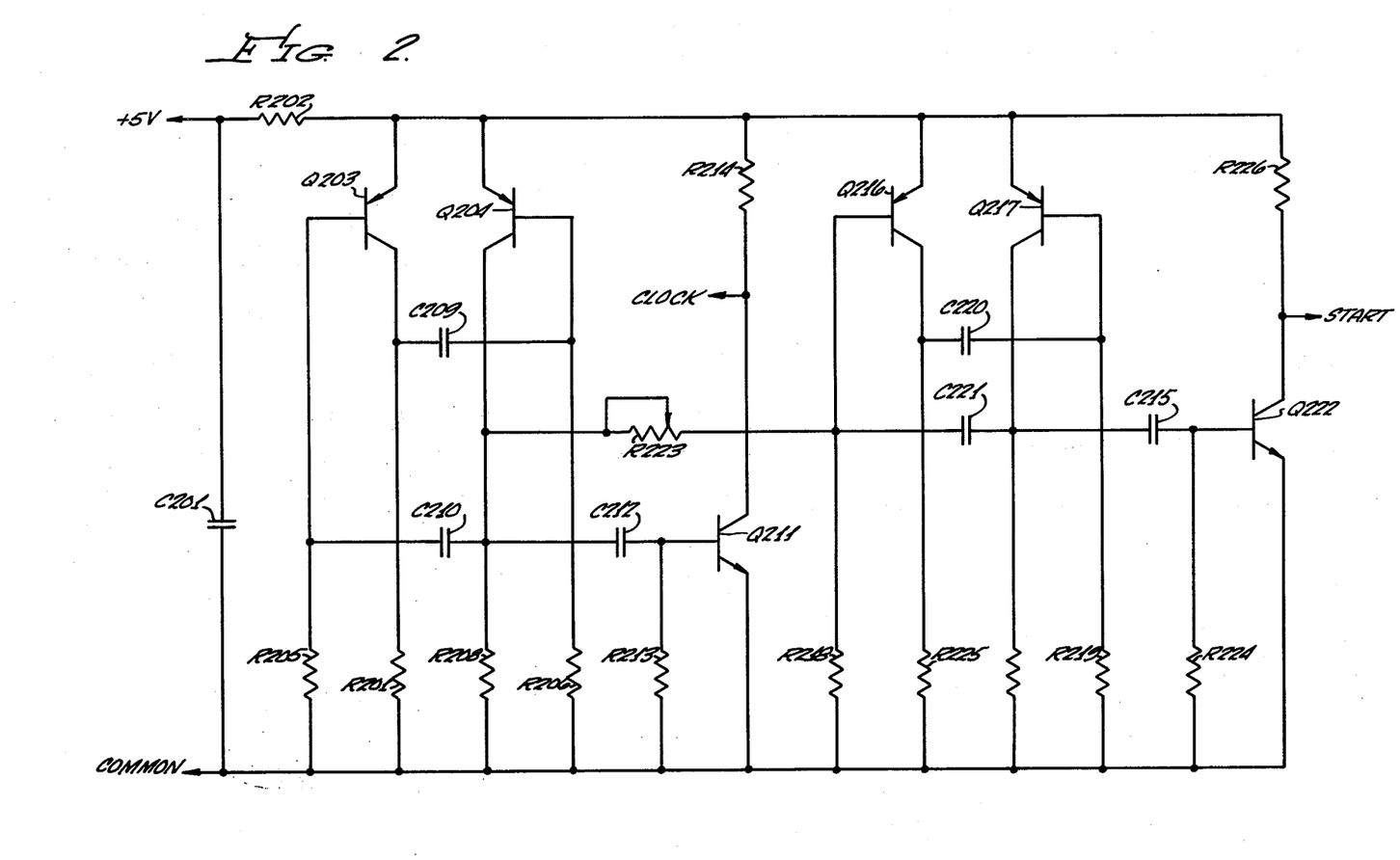
FIG. 2 is a schematic of the clock network shown in block form in FIG. 1.

FIG. 2 shows a circuit which may be used to implement the clock 102. As stated previously, the clock 102 provides both clock and start-of-scan signals to the video array 103.

The RC network comprised of a capacitor C201 and a resistor R202 is used to decouple the generated pulses from the power supply. Transistors Q203 and Q204 are connected in an astable multi configuration with resistors R205 and R206 providing the forward bias, resistors R207 and R208 being the collector load, and capacitors C209 and C210 being the cross coupling capacitors. The output of the multi Q203–Q204 is connected to an output amplifier/buffer Q211 by a pulse-shaping capacitor C212. A transistor Q211 is biased off by a resistor R213. A resistor R214 is the collector load. When the multi Q203–Q204 switches to a positive state, the leading edge of the signal is differentiated by capacitors C212 and C215, thereby obtaining a pulse. The pulse is amplified and buffered by the transistor Q211. The collector output of the transistor Q211 provides the required clock pulse to drive the video array 103.

Transistors Q216 and Q217 are connected in a multi configuration with resistors R218 and R219 being the collector load and capacitors C220 and C221 being the cross coupling capacitors. The multi Q216–Q217 output is connected to the output amplifier Q222 by a pulse-shaping capacitor C215. The transistor Q222 is biased off by a resistor R213. A resistor R214 is the collector load. The collector output of the transistor Q222 provides the required start pulse to drive the video array 103. R224, R225 and R226 provide bearing.

Synchronization of the two multis Q203–Q204 and Q216–Q217 is obtained by a variable resistor R223. The period and frequency of the multis are determined by the time constants of the respective base resistors and cross coupling capacitors. The values chosen provide a start frequency of about 100 Hz, and a clock frequency of about 27 kHz. This allows the video array 103 to sequency through a 256 element line scanner 106 once between each pair of start pulses, the sole requirement being that there must be sufficient time between start pulses to allow the clock to completely step through all elements in the light sensing means, i.e., the line scanner 106.

MEASURING MEANS

Figure 3A:
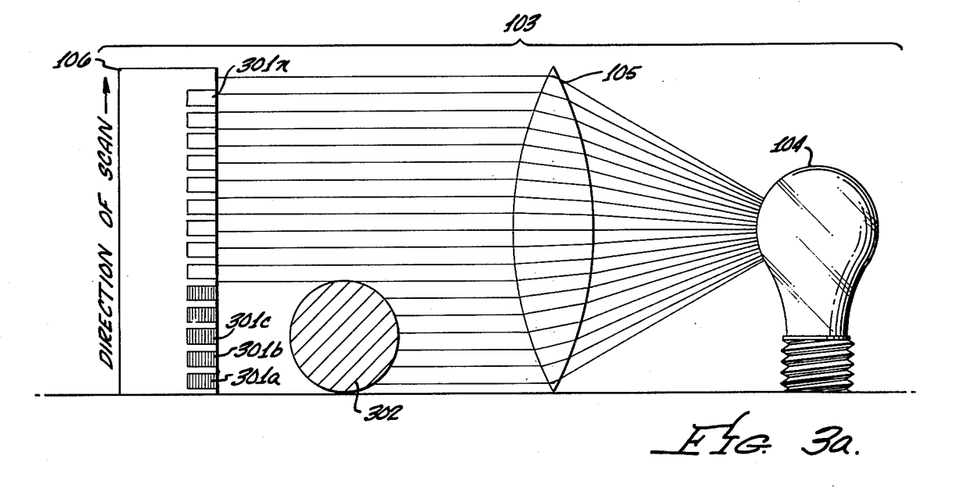
FIG. 3a is an idealized representation of the measuring means shown in FIG. 1.

The video array 103 is depicted diagrammatically in FIG. 3. A lens 105 focuses the light radiated by the light source 104 onto the light sensing means, which in the preferred embodiment comprise a Reticon solid state series line scanner RL-256/128, indicated by reference numeral 106. The line scanner 106 contains a row of 256 silicon photodiodes 301, each of which has a 1-mil-square aperture through which it may receive light from the light source 104. The Reticon line scanner 106 scans automatically when provided with the clock and start-of-scan pulses from the clock 102. The output for each scan of the line scanner 106 is a train of pulses. No output pulses will be generated by those photodiodes which receive no light during the scan.

Consider, for purposes of illustration, the representation of the line scanner 106 shown in FIG. 3a. There, a specimen 302 (shown in cross-section) is situated in measuring position between the focusing lens 105 and the line scanner 106. Photodiodes 301a, b, c, d, and e receive no light from the light source 104 because it is blocked by the specimen 302. However, photodiodes 301f through n do receive light. Thus the pulse train emitted by the line scanner 106 may be presented by the graph of FIG. 3b. At times $t_a$ through $t_e$, no pulses are present. But at times $t_f$ through $t_n$, there are pulses present. A digital representation of the height of the specimen 302 may thus be obtained by counting the pulses shown in FIG. 3b.

PREAMPLIFIER

The preamplifier 107 implements two main functions: the amplification and conditioning of the video and end-of-scan information from the video array 103; and the rendering of the two signals TTL-compatible for processing by succeeding stages of the measuring device 101. In the preferred embodiment of the present invention, it is contemplated that the preamplifier 107 comprises the particular network shown in FIG. 4; but other circuits may also be used to perform the required functions.

Turning now to FIG. 4, it may be seen that a resistor R401 and a capacitor C402 decouple the video array 103 from the power supply. A resistor R403 and a capacitor C404 decouple a first video preamplifier transistor Q405 from the power supply. The transistor Q405 is forward biased by a resistor R406, which is connected to the collector to obtain negative feedback. A resistor R407 is the collector load. A resistor R408 provides additional negative feedback on the emitter of the transistor Q405 to assist in minimizing operating point drift. A resistor R409 provides the DC load and return to ground for the video output of the video array 103. A capacitor C410 helps to reduce stray pickup into the preamplifier 107 caused by the clock pulses. A capacitor C411 couples the video out from the video array 103 into the first preamplifier transistor Q405. A capacitor C412 couples the output of the transistor Q405 to the input of a transistor Q413.

A resistor R414 and a capacitor C415 decouple transistors Q413 and Q416 from the power supply. A resistor R417 provides forward biasing for the transistor Q413, and is connected to the collector for negative feedback. A resistor R418 is the collector load. A resistor R419 provides negative feedback on the emitter of the transistor Q413. The output of the transistor Q413 is connected to the input of the transistor Q416 by a capacitor C420. The transistor Q416 is biased off by a resistor R421. A resistor R422 is the collector load. A capacitor C420 and a resistor R421 provide leading edge pulse shaping such that the output of the transistor Q416 is of proper pulse width (and amplitude) to be processed by the logic and counter circuitry. The transistors Q405, Q413, and Q416 are chosen as NPN, PNP, and NPN, respectively, in order to obtain optimum leading edge rise times on the video signal.

A resistor R423 and a capacitor C424 decouple a transistor Q425 from the power supply; a resistor R426 biases the transistor Q425 off, and provides the proper load and reference to ground for the end-of-scan pulses from the video array 103. A resistor R427 is the collector load for the transistor Q425. The output of the transistor Q425 is an end-of-scan pulse of proper amplitude to be processed by the logic circuitry.

LOGIC

The logic network 108 gates the video information from the preamplifier 107 such that the pulses from only a single video scan go to the memory/gage means 113 in response to any trigger signal. The trigger signal may be obtained from a variety of sources, as discussed previously. R530 serves to limit current to the photocell 110.

Figure 5:
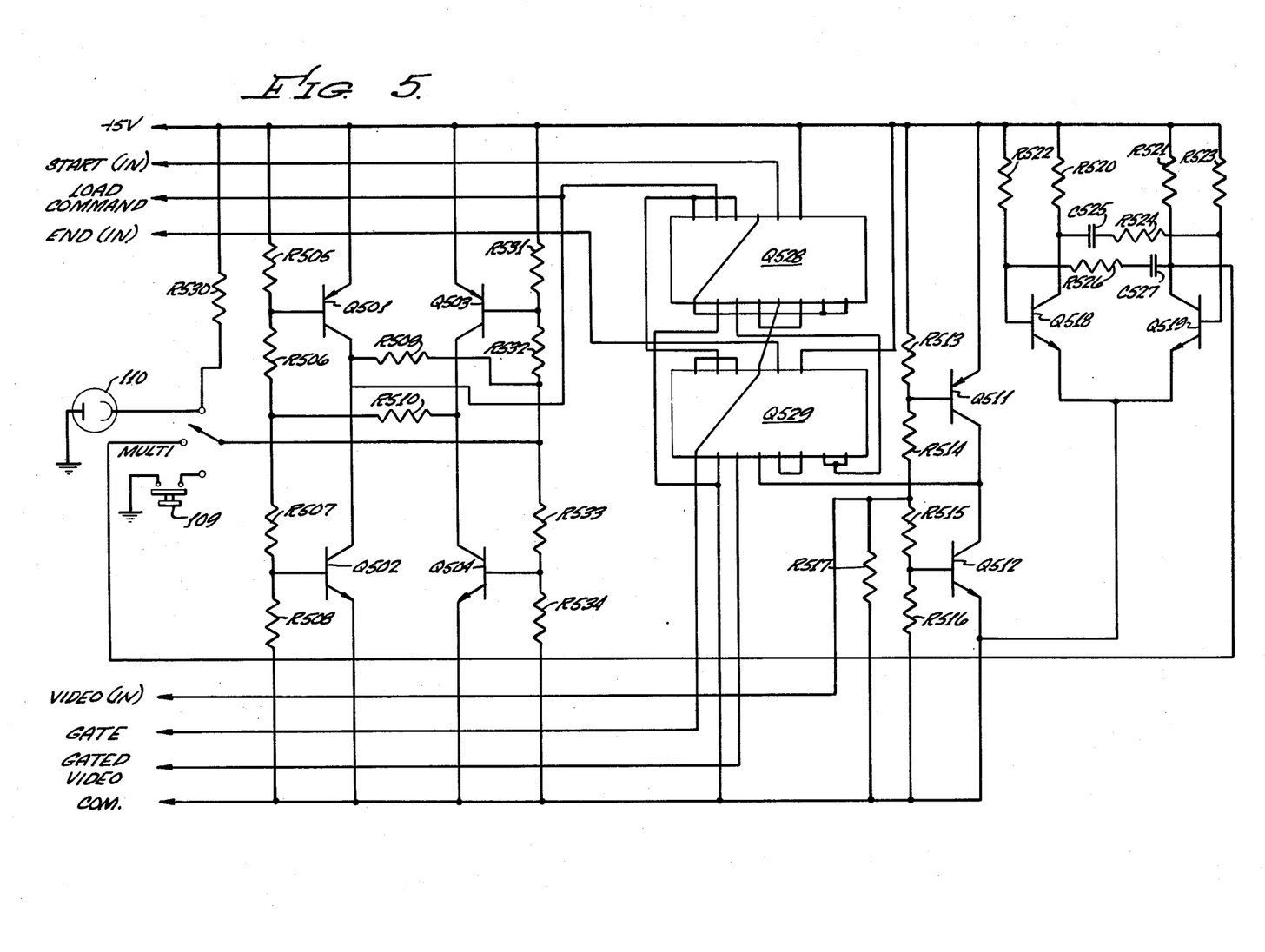
FIG. 5 is a schematic diagram of the logic means shown in block form in FIG. 1.

FIG. 5 shows transistors Q501, Q502, Q503, and Q504 connected as a push-pull flip-flop. The resistors R505, R506, R507, and R508 provide turn-on and biasing for the transistors Q501 and Q502, and resistors R531, R532, R533 and R534 perform a similar function for transistors Q503 and Q504. The resistors R509 and R510 provide the cross coupling and positive feedback required for flip-flop operation. The purposes of the push-pull flip-flop is to allow for a variety of command inputs, and to obtain complementary outputs for operating the logic.

The transistors Q511 and Q512 are connected as a push-pull driver. Resistors R513, R514, R515, and R516 provide turn-on biasing, and a resistor R517 provides a load (and shut-off) for the incoming video signal. The purpose of this driver is to provide video signals suitable for gating and subsequent counting. Transistors Q518 and Q519 are connected as a free-running asymmetrical multi. Resistors R520 and R521 are the collector loads, Q522 and Q523 the base biasing resistors. Respective RC networks R524–C525 and R526–C527 provide the cross coupling. The multi Q518–Q519 is so timed as to provide off times of 0.1 second and on times of 0.9 second. The purpose of the multi Q518–Q519 is to provide a continuous trigger to the logic, when selected by the switch 112.

Figures 3B, 6:
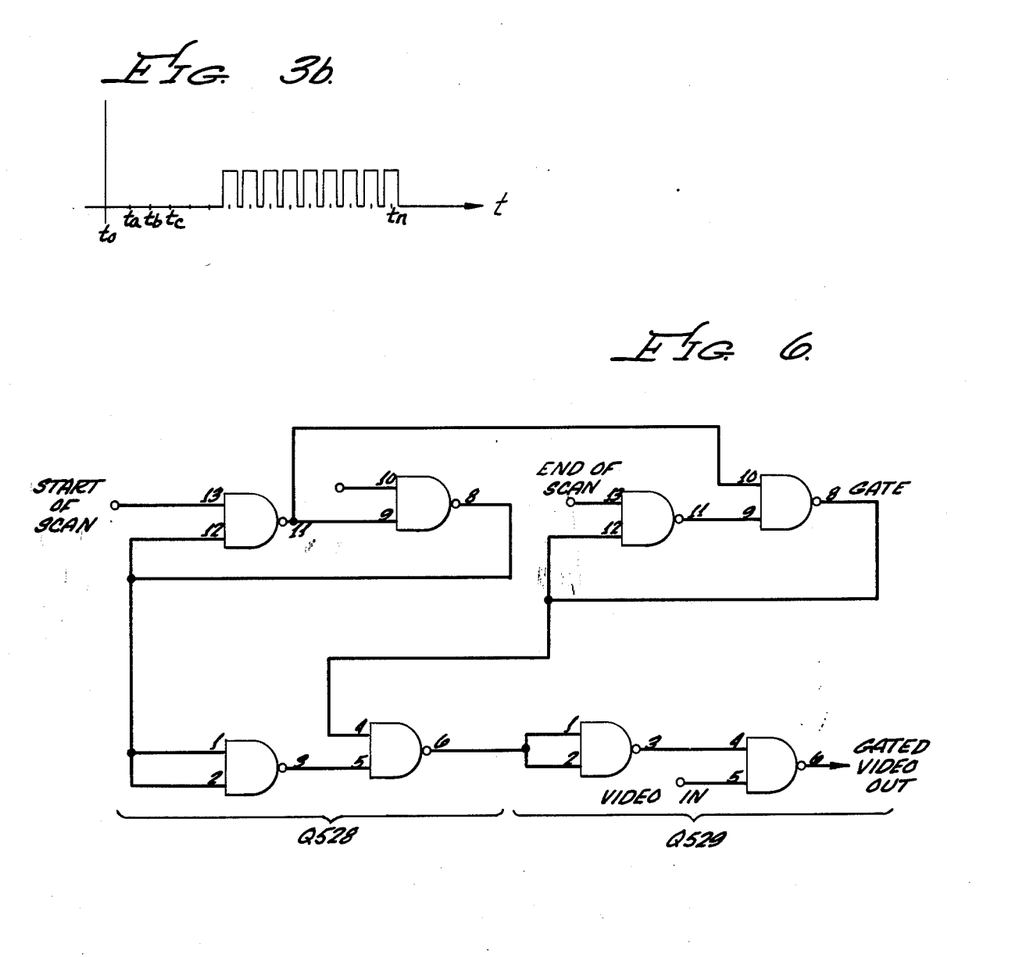
FIG. 3b is a graph of the pulse train emitted by the line scanner of the invention.
FIG. 6 is a logic diagram of the integrated circuits shown in FIG. 5.

The integrated circuits Q528 and Q529 are standard quadruple two-input positive NAND gates, which in the preferred embodiment are implemented by two SN7400 integrated circuits. FIG. 6 is a diagram of the logic performed by Q528 and Q529. The output is a single gated video pulse train.

In operation, when a trigger command is initiated, the logic waits for the next start-of-scan pulse. At the occurrence of the next start pulse, the video pulses (one complete scan only) are gated to the memory/gate means 113. When the scan is complete, the video array 103 puts out an end-of-scan pulse which causes the logic to shut off the video to the counter 113. The video then remains off until the next trigger command is initiated. In this manner, one and only one video pulse train leaves the logic means 108 for each trigger command.

MEMORY/GAGE MEANS

Figure 7:
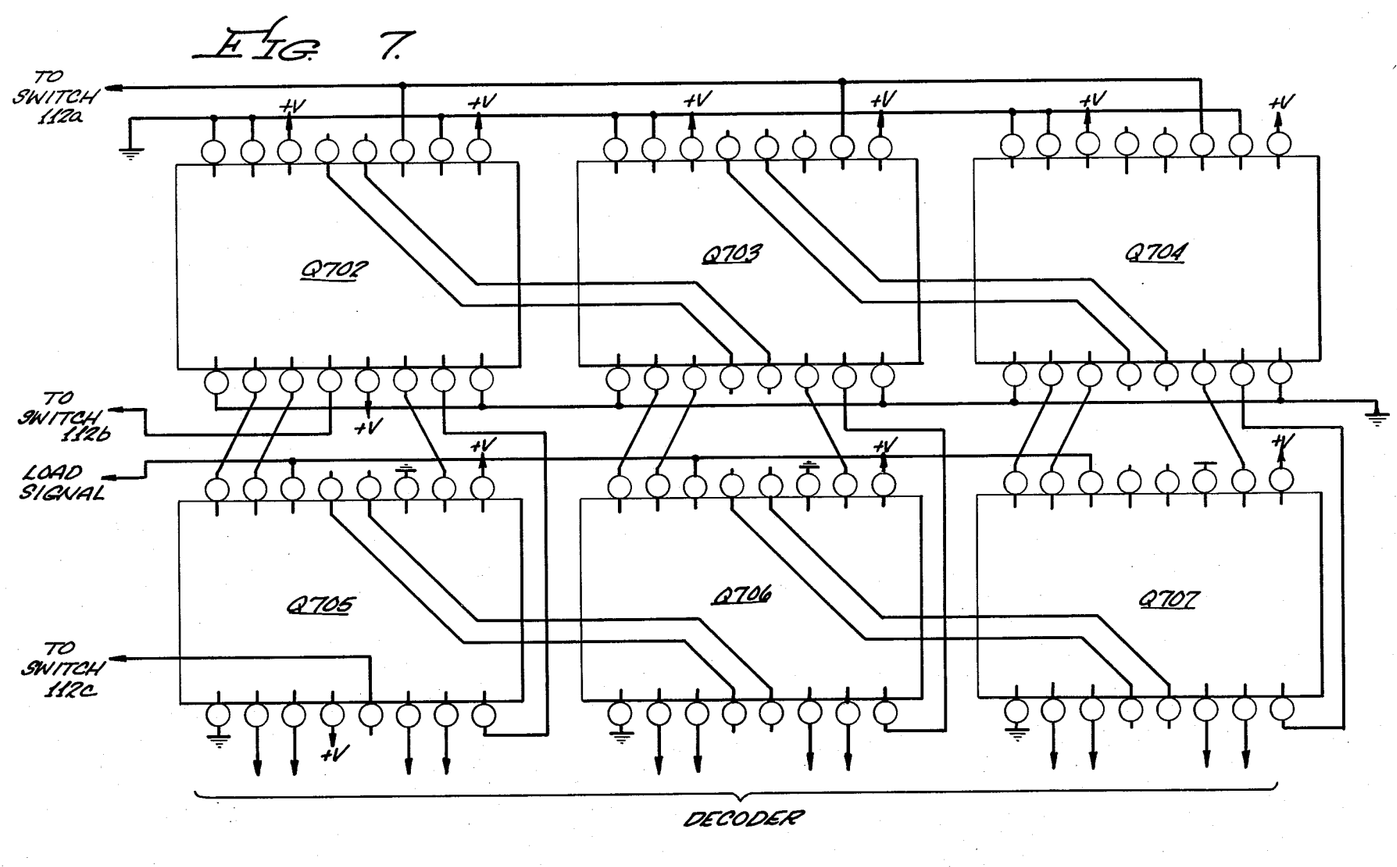
FIG. 7 is a diagram of the memory and gage means shown in FIG. 1.
Figure 8:
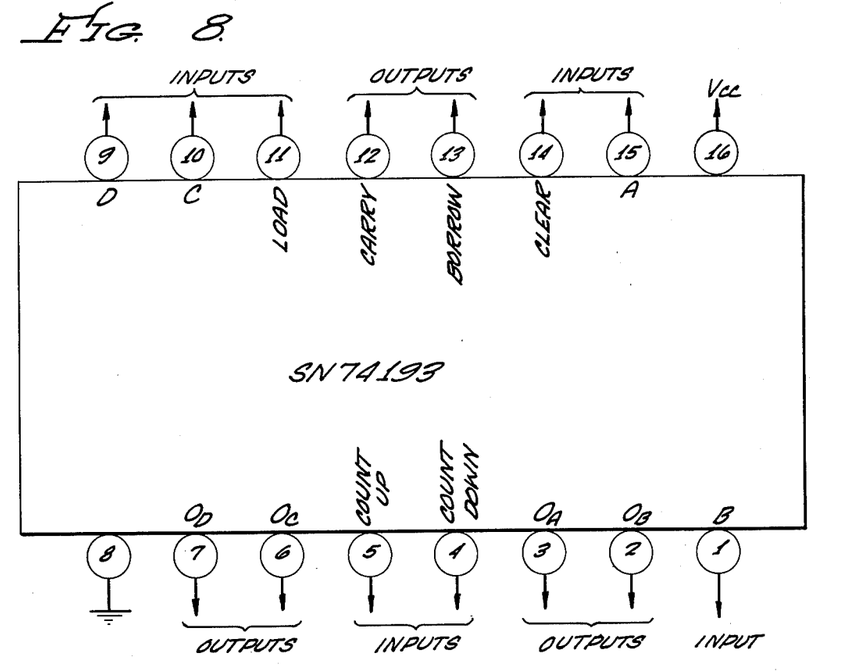
FIG. 8 is a diagram of the integrated circuits of the memory and gage means shown in FIG. 7.

Memory/gage means 113, as shown most explicitly in FIG. 7, stores a reference count in the memory means 113a, compares the stored count with a count of an unknown specimen in the gage means 113b, and displays the resulting dimension information on the display indicators 115.

Switches 112a, b, and c (as shown in FIG. 1) perform the function of directing the various signals to the memory/gage means 113 to effect the "clear", "memory", and "gage" operations. (A resistor R701 serves to limit current). The memory means 113a is comprised chiefly of standard synchronous four bit up/-down counters, which in the preferred embodiment are implemented by SN74193 integrated circuits, indicated by reference numerals Q702, Q703, and Q704. The counters Q702, Q703 and Q704 are disposed so as to count up and store a reference count during the "memory" cycle. Read out may be accomplished non-destructively.

Q705, Q706, and Q707 also comprise synchronous four-bit up/down counters, and it is contemplated, though not necessary, that they be implemented by SN74193 integrated circuits. The counters Q705, Q706, and Q707 are connected so as to receive a reference (up) count from the memory means 113a, and to then cound down therefrom to perform the "gage" operation.

Figure 9:
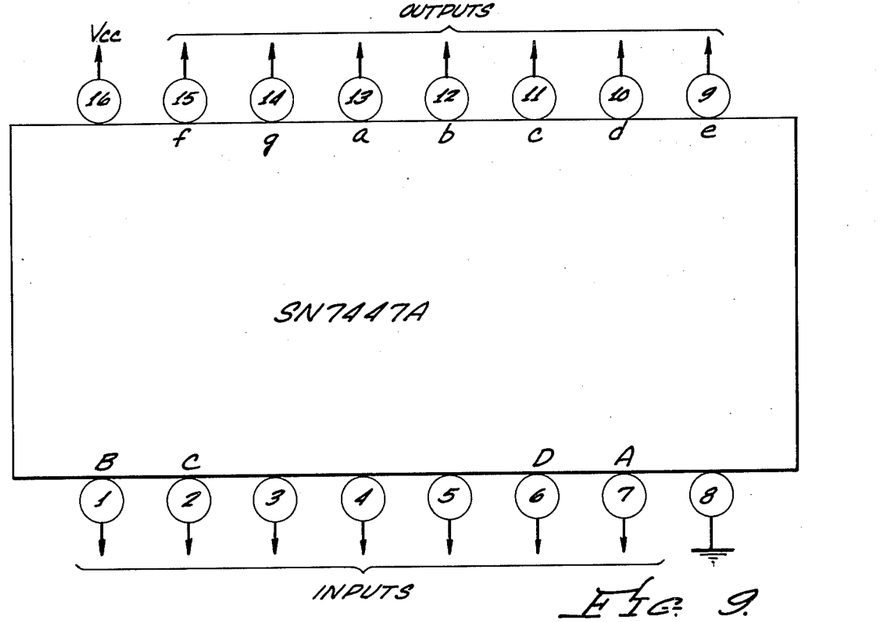
FIG. 9 is a logic diagram of the integrated circuits used to implement the decoder of FIG. 1.

Decoding may be accomplished by standard BCD to seven bar decoder drivers. It is contemplated herein that implementation be achieved with SN7447 integrated circuits, which in turn drive the display lamps 115.

OPERATION-DEVIATION MODE

The operational sequence in the deviation mode is as follows. The memory 113a is first cleared by setting the switch 112 to the "clear" position. The switch 112 is then placed in the "memory" position. Nert, a master specimen is placed in the field of view of the video array 103. Fourth, a trigger command is initiated by enabling the manual switch 109, causing a single gated scan of video to be counted and stored by the memory means 113a. The count stored is equal to the number of photodiodes 301 which have received light and is therefore proportional to the particular dimension of the master specimen. The switch 112 is then placed in either of the three "gage" positions, i.e., positions (1)–(3). Selection of either of the gage positions causes the stored count from the memory means 113a to be loaded into the gage means 113b. An unknown specimen is placed in the field of view of the video array 103. A trigger command is then initiated by the means chosen which, for purposes of illustration only, may be assumed to be the "photocell" position. When the photocell is enabled, a trigger command causes a single gated scan of video to be counted down from the valve loaded into the gage means 113 b. If the unknown specimen has the same dimension as the mster specimen, then a zero will obtain at the gage counter 113b after the down-count. If the unknown specimen is the larger, less cells 301 were on, and there will thus be a plus count left in the counter 113. Conversely, if the unknown specimen is smaller, there will be a minus count in the counter 113. The output of the gage counter 113b is indicative of the difference in size between the master and unknown specimens.

As soon as the unknown specimen passes out of the field of view of the array 301 of the video array 103, the trigger is released, and the gage means 113b automatically clears, and receives and counts up the count from the memory means 113a. The measuring device 101 is then ready to receive the next unknown sepcimen. As many unknown specimens as are desired may be consecutively measured in this way without having to recalibrate the measuring device 101. When it is desired to measure a new master specimen, the "clear" switch is again actuated and the foregoing sequence repeated. Alternatively, the sequence described below may be chosen.

OPERATION—DIMENSION MODE

As in the preceding sequence, the memory means 113b is first cleared by actuating the "clear" function of the switch 112. The switch 112 is then placed in the "memory" position. The trigger command is actuated with no part whatsoever present in the video array 103, which causes the logic 108 to load into the memory means 113a the total number of cells 301 in the video array 103. The switch 112 is next placed in one of the "gage" positions. This causes the memory means 113a to load into the gage means 113b the number of pulses stored in the memory means 113a. Next, an unknown part is passed through the video array 103. Assuming again, for purposes of illustration only, that the "photocell" position has been selected on the switch 112, a trigger command will be initiated and the counter will count down the number of cells 301 receiving light. Hence, in this mode of operation, the resultant down count will always be of lesser magnitude than the stored count, and therefore the result will always be a positive number, which number is the indicative of the actual dimension of the unknown specimen.

When the trigger is released, the gage means 113b clears, and again receives and counts up the memory count. The device 101 is then ready to receive the next unknown specimen. As before, as many unknown specimens as desired may be measured, so long as the clear, function is not activated. Once that switch is activated, the electro-optical measuring device 101 is ready to store a new memory count and to repeat the above-described sequence; or in the alternative, it may next be used in the deviation mode.

What is claimed is:

1. A device for comparing the corresponding dimensions of a master specimen and a plurality of unknown specimens, comprising:
   means for directly measuring a corresponding linear size dimension of a master specimen and a plurality of unknown specimens to produce a plurality of digital signals, said plurality comprising:
   a first digital signal defining said linear size dimension of said master specimen; and
   a plurality of second digital signals defining said corresponding linear size dimension of said plurality of unknown specimens;
   a memory for storing said first digital signal obtained from direct measurement of said linear size dimension of said master specimen;
   means for repetitively producing an output signal from said memory indicative of said first digital signal, said means not removing said first digital signal from said memory; and means for comparing respective ones of said plurality of second digital signals representative of the corresponding linear size dimensions of said unknown specimens with respective memory output signals.

2. The device defined in claim 1, in which said first and second digital signals comprise counts of respective pulse trains.

3. The device defined in claim 2 in which said memory comprises a first counter which non-destructively outputs said stored count upon command.

4. The device defined in claim 3, in which said memory counter comprises a four bit, synchronous, up/down counter.

5. The device defined in claim 3, in which said means for comparing comprises a second counter which accepts said stored count outputted by said first counter and counts backwards therefrom.

6. The device defined in claim 2 in which said means for comparing comprises a comparing counter which accepts a count and counts backwards from said accepted count.

7. The device defined in claim 6 in which said comparing counter comprises a four bit, synchronous, up/down counter.

8. A device as defined in claim 1 wherein said measuring means comprises:
a light source;
an array of photosensitive elements, each element positioned to be illuminated by said light source unless blocked by one of said master or unknown specimens;
means for sensing the position of said master or unknown specimens relative said array; and
gating means responsive to said sensing means for outputting said first and second digital signals in response to a predetermined operative relationship between said specimens and said array.

9. A measuring device, comprising:
means for generating a command signal;
measuring means for providing digital signal indicative of a particular linear size dimension of a master specimen and digital signals indicative of a corresponding linear size dimension of plural unknown specimens when there is a time coincidence of said command signal with an operative spatial relationship between said master specimen or unknown specimens, respectively, and said measuring device;
memory means for storing said digital signal indicative of said particular dimension of said master specimen; and
gage means responsive to said memory means and said measuring means for successively comparing said stored digital signal indicative of said particular dimension of said master specimen with said digital signals indicative of the corresponding dimensions of a plurality of unknown specimens.

10. A measuring device as defined in claim 9, in which said means for generating a command signal provides said command signal in response to a manually-operated switch.

11. A measuring device as defined in claim 9, in which said memory means stores said digital signal responsive to external switch means.

12. A measuring device as defined in claim 9, in which said gage means operates responsive to external switch means.

13. A measuring device as defined in claim 12, in which said command signal means and said memory means operate in response to said external switch means.

14. Apparatus for comparing a particular dimension of a master specimen with the corresponding dimension of an unknown specimen, comprising:
means for generating a first pulse train when a master specimen is disposed in an operative relationship with said means for generating a first pulse train, the number of pulses in said first pulse train representing a particular linear size dimension of said master specimen;
means for automatically generating a second pulse train in response to the placement of an unknown specimen in an identical operative relationship with said means for generating a second pulse train, the number of pulses in said second pulse train representing the linear size dimension of said unknown specimen which corresponds to said particular linear size dimension of said master specimen;
means for counting said pulses in said first pulse train to produce a first count, and for storing said first count; and
means for counting said pulses in said second pulse train to produce a second count and for comparing said second count with said first count.

15. Apparatus as defined in claim 14 additionally comprising external switch means which further comprise:
means for enabling said means for generating a first pulse train;
means for enabling said means for generating a second pulse train; and
means for clearing said stored first count.

16. Apparatus for comparing a particular dimension of a master specimen with the corresponding dimension of an unknown specimen, comprising:
measuring means for providing a first and second series of pulsee trains when said respective specimens are placed in operative relationship with said measuring means, said pulse trains of said first series of pulse trains representing said particular linear size dimension of said master specimen, and said pulse trains of said second series of pulse trains representing said corresponding linear size dimension of said unknown specimen;
logic means responsive to said measuring means for outputting one of said pulse trains of said first series of pulse trains and responsive to the position of said unknown specimen relative said measuring means for automatically outputting one of said pulse trains of said second series of pulse trains;
memory means responsive to said logic means for making and storing a first count of the number of pulses in said one of said pulse trains of said first series of pulse trains, and for outputting said first count; and
gage means responsive to said logic means and said memory means for receiving said first count from said memory means and for subtracting therefrom a second count obtained by counting the number of pulses in said one of said pulse trains of said second series of pulse trains to produce a gage signal.

17. Apparatus as defined in claim 16, additionally comprising display means for visually displaying said gage signal.

18. A method for comparing a dimension of a plurality of unknown specimens with a particular dimension of a master specimen, which comprises:
   a. generating a digital signal pulse train responsive to the physical presence of said master specimen indicative of the magnitude of said particular dimension of said master specimen;
   b. counting the pulses of said pulse train indicative of the magnitude of said measured dimension of said master specimen to produce a first count;
   c. storing said first count;
   d. sensing the location of said unknown specimens in a predetermined position;
   e. automatically generating a digital signal pulse train indicative of the magnitude of said dimension of a first unknown specimen in response to said sensing step;
   f. counting said pulses of said digital signal pulse train indicative of the magnitude of said measured dimension of said unknown specimen to produce a second count;
   g. subtracting one of said second count and said stored first count from the other of said second count and said stored first count; and
   h. repeating steps (d) through (g) for each succeeding unknown specimen.

19. A method for determining particular corresponding linear size dimensions of a plurality of unknown specimens, utilizing a video array comprising a light source directed toward a linear array of light sensing means, which method comprises:
   a. generating a pulse train containing a number of pulses equal to the total number of light sensing means;
   b. counting the number of said pulses which is equal to the total number of light sensing means to produce a first count;
   c. storing said first count;
   d. generating a pulse train, the number of pulses of which is indicative of said particular linear size dimension of said first unknown specimen;
   e. counting said pulses indicative of said particular linear size dimension of one of said unknown specimens to produce a second count;
   f. subtracting one of said first and second counts from the other of said first and second counts to produce a difference count;
   g. displaying said difference count; and
   h. repeating steps (d) through (g) once for each remaining unknown specimen.

* * * * *